(12) United States Patent
Kelley

(10) Patent No.: US 11,044,695 B1
(45) Date of Patent: Jun. 22, 2021

(54) INFRASONIC ALERT AND NOTIFICATION SYSTEM

(71) Applicant: UIPCO, LLC, San Antonio, TX (US)

(72) Inventor: Patrick R. Kelley, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/599,472

(22) Filed: Oct. 11, 2019

Related U.S. Application Data

(60) Provisional application No. 62/752,922, filed on Oct. 30, 2018.

(51) Int. Cl.
| | |
|---|---|
| *G08B 1/08* | (2006.01) |
| *H04W 68/00* | (2009.01) |
| *G08B 6/00* | (2006.01) |
| *G08B 3/10* | (2006.01) |
| *G08B 7/06* | (2006.01) |
| *H04M 11/04* | (2006.01) |
| *H04M 1/72412* | (2021.01) |
| *H04M 1/72436* | (2021.01) |

(52) U.S. Cl.
CPC ........ *H04W 68/005* (2013.01); *G08B 3/1016* (2013.01); *G08B 6/00* (2013.01); *G08B 7/06* (2013.01); *H04M 1/72412* (2021.01); *H04M 1/72436* (2021.01); *H04M 11/04* (2013.01)

(58) Field of Classification Search
CPC ..... H04W 68/005; G08B 3/1016; G08B 6/00; G08B 7/06; H04M 1/7253; H04M 1/72552; H04M 11/04
USPC ..................................................... 340/539.1
See application file for complete search history.

(56) References Cited

U.S. PATENT DOCUMENTS

| | | | |
|---|---|---|---|
| 6,369,312 B1* | 4/2002 | Komatsu | G10H 1/00 381/150 |
| 8,271,204 B2* | 9/2012 | Choi | G06K 9/00348 702/19 |
| 2007/0001825 A1* | 1/2007 | Roby | G08B 6/00 340/407.1 |
| 2007/0018877 A1* | 1/2007 | Bailey | G08C 17/02 341/176 |
| 2010/0302025 A1* | 12/2010 | Script | G08B 25/005 340/539.1 |

(Continued)

*Primary Examiner* — Naomi J Small
(74) *Attorney, Agent, or Firm* — Perkins Coie LLP

(57) ABSTRACT

The systems, methods, and devices disclose a transducer system located in a room or in an area to provide an alert to one or more persons. The transducer system includes at least a receiver, a processor and a speaker. The receiver receives an alert message sent from an alarm system or from another transducer system. The processor is configured to determine, from a plurality of notification messages, a notification message based on the alert event indicated by the alert message. Each of the plurality of notification messages corresponds to a different alert event, and each of the plurality of notification messages includes information to vibrate a speaker according to a different pre-determined vibration pattern. The speaker is moveable to generate a vibration pattern according to the determined notification message to inform a person about the alert event, wherein the speaker generates the vibration pattern in a low-frequency range.

17 Claims, 4 Drawing Sheets

(56) References Cited

U.S. PATENT DOCUMENTS

| | | | |
|---|---|---|---|
| 2012/0319858 A1* | 12/2012 | Tas | G08B 21/22 |
| | | | 340/686.6 |
| 2015/0106061 A1* | 4/2015 | Yang | G08C 17/00 |
| | | | 702/188 |
| 2016/0210844 A1* | 7/2016 | Kim | G08B 6/00 |
| 2016/0217662 A1* | 7/2016 | Kashar | G09B 21/009 |
| 2017/0004700 A1* | 1/2017 | Kim | G08B 25/08 |
| 2019/0012885 A1* | 1/2019 | Kashar | G06F 1/163 |
| 2019/0015688 A1* | 1/2019 | Stimek | A62C 37/12 |

* cited by examiner

INFRASONIC ALERT AND NOTIFICATION SYSTEM

CROSS-REFERENCE TO RELATED APPLICATIONS

This application is a non-provisional of and claims priority to U.S. Provisional Application No. 62/752,922, filed on Oct. 30, 2018, entitled "INFRASONIC ALERT AND NOTIFICATION SYSTEM," which is hereby incorporated by reference in its entirety for all purposes.

BACKGROUND

Assistive technology is designed to provide a visual or an auditory alert to people with hearing loss or visual impairment. Such alerts may be provided for potentially dangerous situations such as smoke in the house or for other situations such as a baby crying. Assistive technology devices may be categorized in at least two categories. A first type of assistive technology devices tends to be limited to mobile systems where a person carries a mobile device that can vibrate or can provide some visual cues based on an alert information received from a transmitter. One issue with the first type of assistive mobile devices is that they have to be periodically charged to operate properly. For persons with lower hearing or lower vision, a second type of assistive technology devices may play sound at an increasing intensity or may vary the intensity of light. One issue with the second type of assistive technology devices is that it can startle people who may not be visually or hearing impaired.

Figure 1:
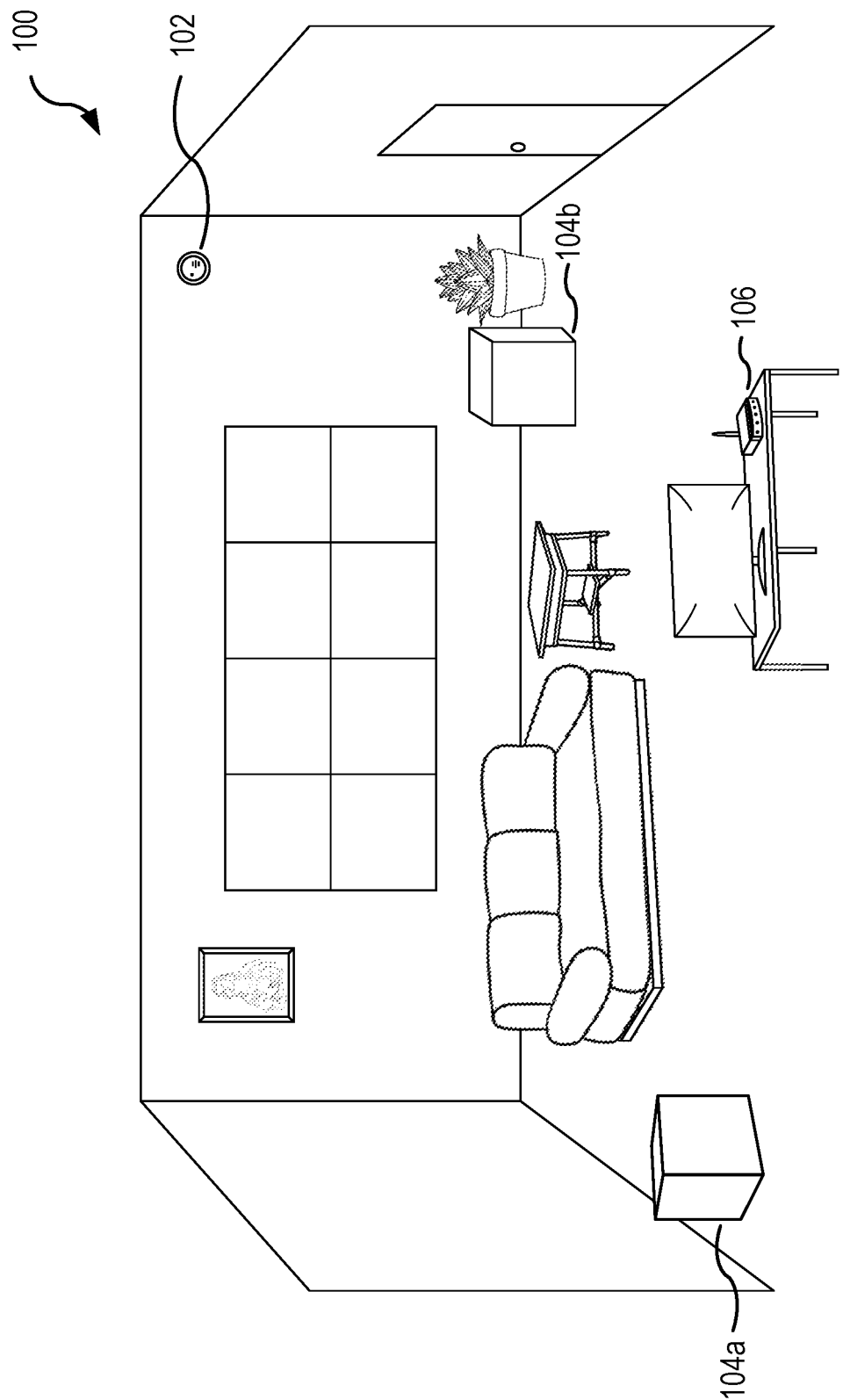
FIG. 1 shows an exemplary assistive technology system in a room or an area.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The systems, devices, and methods described in this patent document enable persons who are permanently deaf or blind, or persons who have some visual or hearing impairment, or persons who are otherwise distracted to receive notifications. Some examples of notifications may include an activated fire alarm or carbon monoxide alarm, a weather-related warning, or an incoming phone call or text message. The assistive technology described in this patent document can provide an infrasonic alert or notification to a person by using very low frequency sound to vibrate, for example, a floor or a wall or a foundation of a building (e.g., house or office) or a vehicle, where the person is located in or around the building or vehicle. One benefit of the described assistive technology is that a person in contact with a surface in the building or vehicle, for example, seated or standing or leaning, can receive the infrasonic alert or notification to inform that person of an event related to the alert. Another benefit of the exemplary assistive technology is that a person does not have to see or be able to hear to receive the alert or notification, though hearing and seeing people can also detect the alert.

FIG. 1 shows an example of an assistive technology system in a room or an area. The assistive technology system 100 includes an alarm system 102, such as a home security system, a fire alarm, or carbon monoxide detector. The alarm system 102 can be considered a communication system that can communicate with the one or more transducer systems 104a-104b. For example, the alarm system 102 is configured to send to one or more transducer systems 104a-104b an alert message in response to determining an alert event. Some examples of an alert event may include a fire emergency, a weather-related warning, an incoming phone call, or an incoming text message. Thus, the alarm system 102 can trigger the operation of the one or more transducer systems 104a-104b by sending the alert message.

In some embodiments, the alarm system 102 can send the alert message to the one or more transducer system using wireless fidelity (Wi-Fi) router 106. In some other embodiments, the alarm system 102 and the one or more transducer systems 104a-104b can be hardwired to each other. In embodiments that include more than one transducer system, the alarm system 102 can send the alert message to a first transducer system 104a (i.e., a master system), and the first transducer system 104a sends the alert message to the second transducer system 104b (i.e., a slave system), and so on. In some embodiments, a mobile device can send an alert message to one or more transducer systems 104a-104b.

The one or more transducer systems 104a-104b are located in a room or in an area as shown in FIG. 1. For example, the one or more transducer systems 104a-104b may be located in a person's house or apartment or on one or more floors of an office building or in a vehicle (e.g., a recreational vehicle). In some embodiments, one or more transducer systems may be located on top of a floor of an area (as shown in FIG. 1) or next to a wall, so that a vibration pattern generated by a speaker (as further described in FIG. 2) can be transmitted from one location in the room to another location in or around the room. In some other embodiments, one or more transducer systems may be located in a wall or in a raised platform (e.g., a raised floor). The components and operations of a transducer system is explained in the context of FIG. 2.

Figure 2:
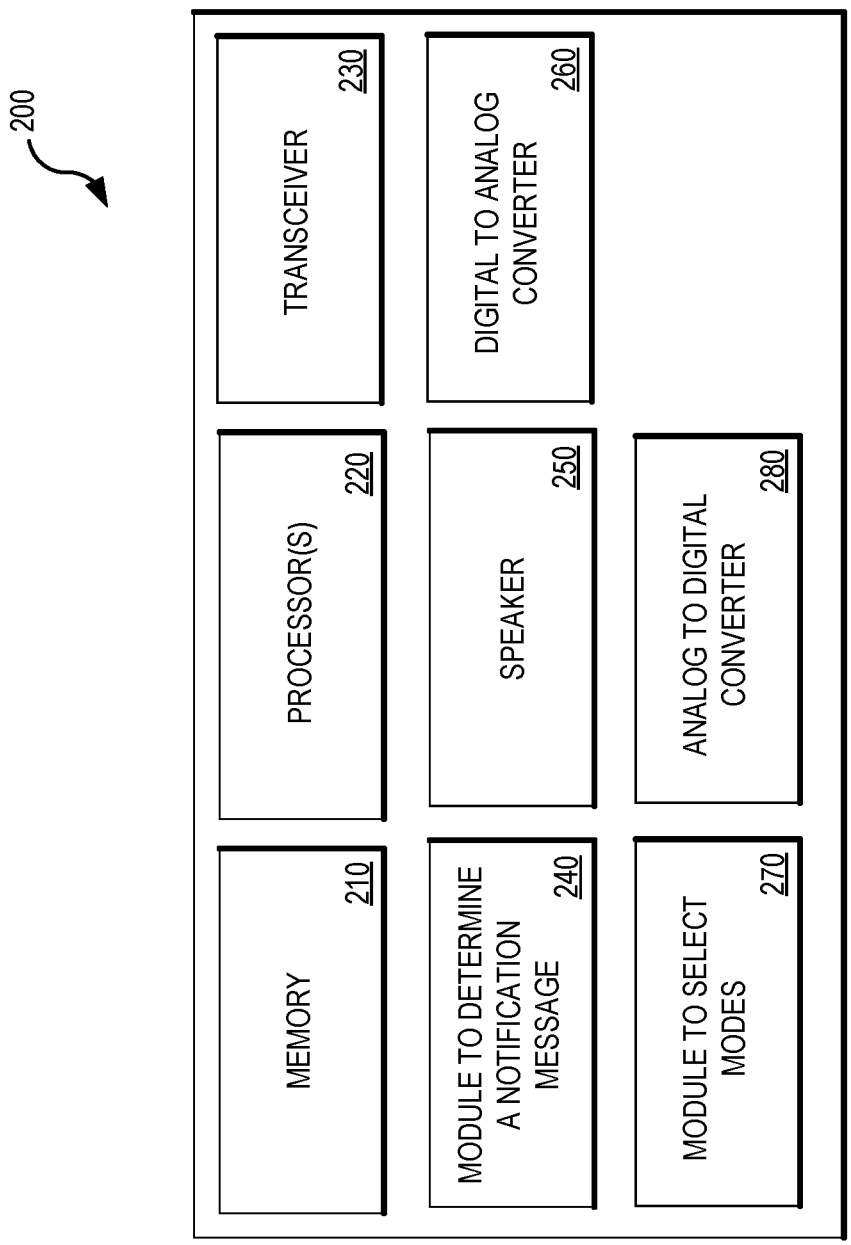
FIG. 2 shows a block diagram of a transducer system.

FIG. 2 shows a block diagram of a transducer system. As further explained below, a transducer system 200 generates a vibration pattern based on an alert message received from the alarm system (described in FIG. 1). The transducer system 200 includes at least one processor 220 and a memory 210 having instructions stored thereupon. The instructions upon execution by the processor 220 configure the transducer system 200 to perform the operations described in FIG. 3, and to perform the operations associated with the various modules described in FIG. 2.

According to the embodiments shown in FIG. 2, transducer system 200 can include memory 210, one or more processors 220, transceiver 230, module to determine a notification message 240, speaker 250, digital to analog converter 260, module to select modes 270, and analog to digital converter 280. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module.

Memory 210 can be any device, mechanism, or populated data structure used for storing information. In accordance with some embodiments of the present disclosure, memory 210 can encompass, but is not limited to, any type of volatile memory, nonvolatile memory, and dynamic memory. For example, memory 210 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 210.

Memory 210 may be used to store instructions for running one or more applications or modules on processor(s) 220. For example, memory 210 could be used in one or more embodiments to house all or some of the instructions needed to execute the functionality of the various modules.

The transducer system 200 includes a transceiver (i.e., a transmitter and a receiver). The receiver can receive the alert message from the alarm system or from another transducer system.

A module to determine a notification message 240 can determine or select a notification message from a plurality of notification messages based on the alert event indicated by the alert message. Each of the plurality of notification messages corresponds to a different alert event. Furthermore, each of the plurality of notification messages includes information to vibrate a speaker 250 according to a different pre-determined vibration pattern. For example, if the alert message relates to an activated fire alarm, the module to determine a notification message 240 can select a notification message that corresponds to the fire alarm, and the speaker 250 can generate a vibration pattern based on the notification message. In another example, if the alert message relates to an incoming text message, the module to determine a notification message 240 can select another notification message that corresponds to the incoming text message, and the speaker 250 can generate a vibration pattern based on the determined another notification message.

An example of a vibration pattern may include a series of vibrations or pulses over a period of time, where the series of vibrations may have a pre-determined intensity and a pre-determined period of vibration. The intensity and period of vibration may vary. In some embodiments, processor 220 may repeat the vibration pattern or may play the vibration pattern on the speaker 250 for a pre-determined period of time (e.g., two-minutes). Thus, alerts, alarms, signals, or simple directions can be given through repeated pulses and patterns to alert one or more persons located in or near a room or an area that has the transducer system. In some embodiments, a mobile device application, based on an input from a person, may send a message to one or more transducer systems to instruct the one or more transducer systems to stop playing the vibration pattern on their respective speakers.

In some embodiments, a mobile device application, based on another input from a person, can send a notification message to the one or more transducer systems, where the speaker of each transducer system is structured to generate a vibration pattern corresponding to the notification message. For example, a person located in his or her office can use his or her mobile device to send a notification message via the Internet to one or more transducer systems located at that person's home to inform another person located in or near the home of an alert event (e.g., an evacuation due to flood warning).

The speaker 250 is operable to generate a vibration pattern according to a notification message determined by the module to determine a notification message 240. The transducer system 200 may include a digital-to-analog converter (DAC) 260 that can receive from the module to determine a notification message 240 the notification message. The DAC 260 can process the information in the notification message (i.e., information to vibrate the speaker) and can generate analog signals corresponding to the vibration pattern indicated by the notification message. The analog signals are used by the speaker 250 to generate the associated vibration pattern and/or sound. The generated vibration pattern informs a person about the alert event because the vibration pattern is associated with a notification message that is related to an alert event.

The speaker 250 generates the vibration pattern in a very low-frequency range. By using very low frequency sound, the speaker can provide alerts and notifications to persons who may be distracted. Furthermore, by using very low frequency sound to vibrate a floor or a wall, the transducer system can be beneficial to a large population because most people are sensitive to vibration. The speaker 250 may be an infrasonic speaker capable of producing infrasound waves or vibrations. A benefit of using an infrasonic speaker is that it can generate a vibration pattern that can be transmitted through solid objects without much attenuation, as is the case for speakers transmitting using higher frequencies.

In some embodiments, the speaker 250 of a transducer system can operate in two modes. In the first mode, the speaker 250 can operate to detect vibrations based on a movement of another person near the speaker, and to provide an electrical output based on the detected vibrations. The analog to digital converter 280 can convert the electrical output provided by the speaker 250 so that the processor 220 can process the digitized electrical output to determine whether a person is walking or moving close to the speaker 250. The processor 220 of the transducer system 200 in response to the electrical output provided by the speaker, determines a second notification message to vibrate the speaker in a second mode. The processor determines a second notification message to alert a person in or near the room that a presence of another person or a movement caused by another person has been detected. The speaker 250 can generate a second vibration pattern according to the second notification message. In some embodiments, the processor 220 sends a message to a different alarm system or a device. These modes may be helpful in alerting users of an intruder, sleepwalking child, or other situation.

The module to select modes 270 can select between the speaker operating in the first mode or the second mode. For example, a module to select modes 270 can enable the speaker to operate in a first mode for a first pre-determined period of time, and can enable the speaker to operate in a second mode for a second pre-determined period of time.

Figure 3:
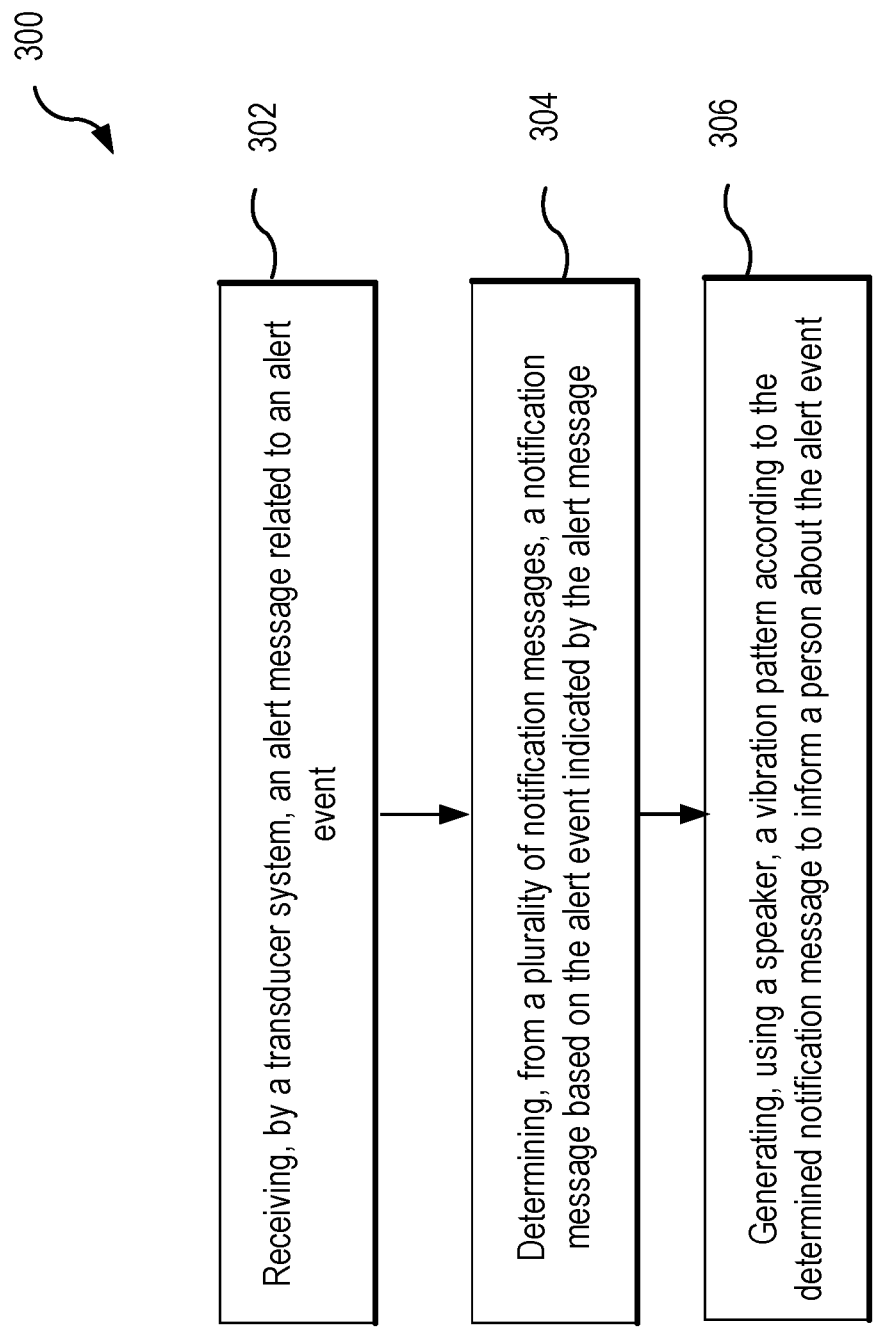
FIG. 3 shows a flowchart of operations that can be performed by a transducer system.

FIG. 3 shows a flowchart of operations performed by a transducer system. At the receiving operation 302, a transducer system located in a room or in an area receives an alert message related to an alert event. The alert message may be sent by an alert system, from another transducer system, or from a mobile device. The alert event may include a fire emergency, a carbon monoxide emergency, a weather-related warning, an incoming phone call, or an incoming text message. In some embodiments, the transducer system is included in a room or in an area that is located in a building or in a vehicle, where the transducer system is attached in the vehicle or is attached to a floor in the building.

At the determining operation 204, the transducer system determines, from a plurality of notification messages, a notification message based on the alert event indicated by the alert message. Each of the plurality of notification messages corresponds to a different alert event, and each of the plurality of notification messages includes information to vibrate a speaker according to a different pre-determined vibration pattern.

At the generating operation 306, a speaker on or in the transducer system generates a vibration pattern according to the determined notification message to inform a person about the alert event, wherein the speaker generates the vibration pattern in a low-frequency range. In some embodiments, the vibration pattern is repeated for a pre-determined period of time. The low frequency range may include 0.1 Hz to 20 Hz.

In some embodiments, the transducer system can detect, using the speaker, vibrations based on a movement of another person near the speaker. Based on the detected vibrations, the speaker can provide an electrical output. The speaker can detect the vibrations and provide the electrical output when operating in a first mode. The transducer system can also determine, in response to the electrical output, a second notification message to vibrate the speaker. Based on the second notification message, the speaker can generate a second vibration pattern, where the second vibration pattern is generated by the speaker operating in a second mode.

In some embodiments, the transducer system's receiver can receive, from a mobile device, another notification message. In response to the another notification message, the transducer system's processor can process the vibration pattern provided by the notification speaker and can control the speaker to generate another vibration pattern corresponding to the another notification message.

In some embodiments, the transducer system's receiver can receive from a mobile device, a message that includes an instruction for the transducer system to stop playing the vibration pattern. In response to the received message, the transducer system stops playing the vibration pattern on the speaker.

Most conventional assistive technology solutions focus on one individual in a home or environment who needs special accommodations, rather than providing a solution that can reach many people equally. Moreover, conventional assistive technology employs personal or portable devices that may use higher sound volume or higher light intensity alerts that might be too loud or frightening to persons located in the house other than the person who is the recipient of the alert. The systems, devices and methods described in the patent document enables a person to get an infrasonic alert to be informed of an event associated with the alert irrespective of that person's hearing or visual disabilities. Thus, the exemplary assistive technology system can target the broadest possible audience instead of conventional assistive technology that narrowly focuses on a subset of persons.

Figure 4:
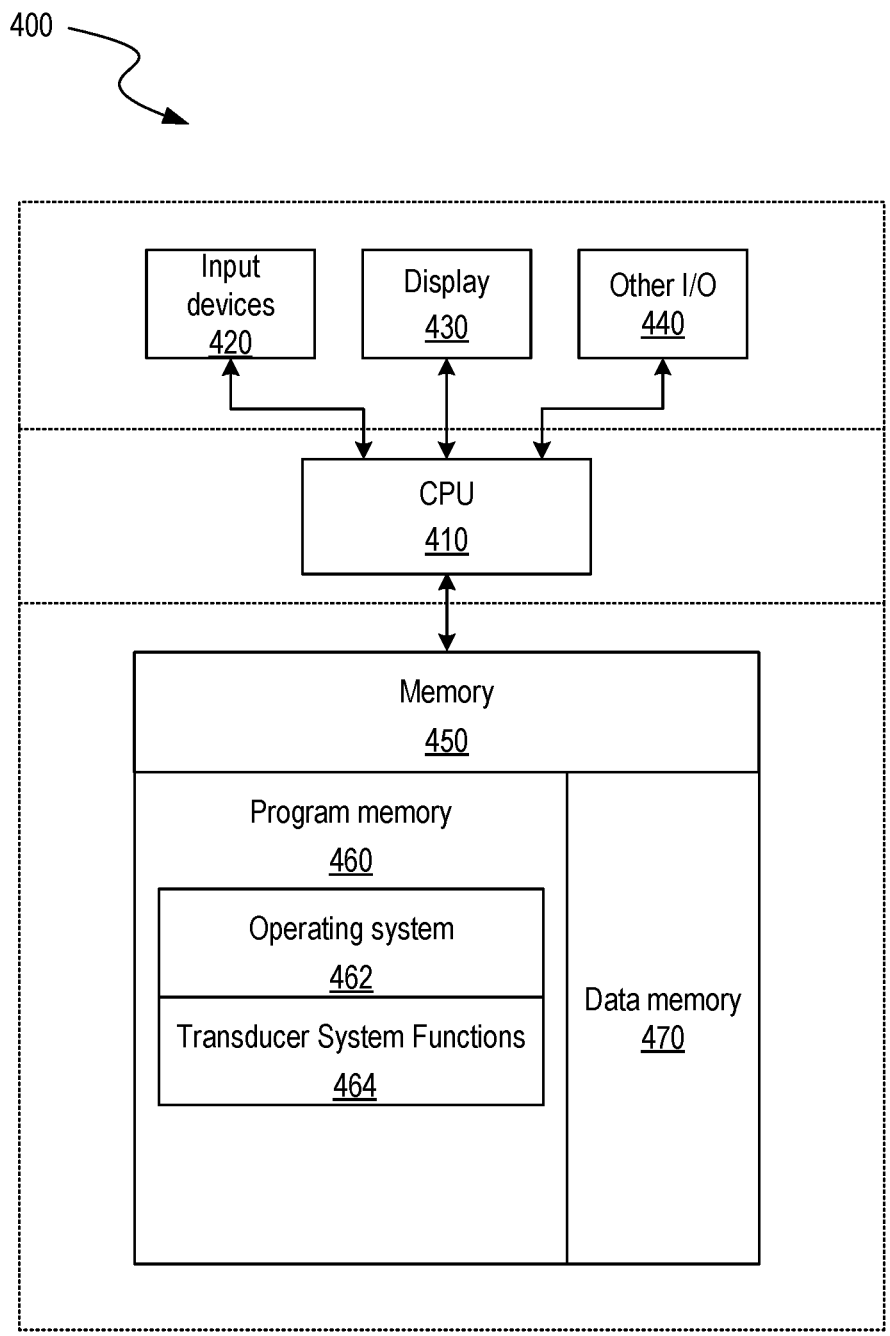
FIG. 4 is a block diagram illustrating an overview of devices on which some implementations of the disclosed technology can operate.

FIG. 4 is a block diagram illustrating an overview of devices on which some implementations of the disclosed technology can operate. The devices can comprise hardware components of a device 400 that manages the operations or features associated with the transducer system. Device 400 can include one or more input devices 420 that provide input to the CPU 410, notifying it of actions, such as alert messages or notification messages. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, a mobile device (e.g., a mobile phone or a tablet), or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node, such as a router. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, transducer system functions 464. Memory 450 can also include data memory 470 that can include the notification messages, etc., which can be provided to the program memory 460 or any element of the device 400. The CPU 410 can perform operations associated with the transducer system as described in this patent document.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system comprising:
one or more speakers;
one or more processors; and
one or more memories storing instructions that, when executed by the one or more processors, cause the system to perform a process comprising:
  determining that a timer has reached a first pre-determined amount of time and in response, transitioning the system to being in a first mode, wherein the system, in response to being in the first mode;
    detects, by the one or more speakers, vibrations based on movement of a first erson; and
    transmits, by the one or more speakers, an electrical output based on the detected vibrations;
  in response to the electrical output provided by the one or more speakers, determining a corresponding first vibration pattern; and
  determining that the timer has reached a second pre-determined amount of time and in response, transitioning the system to being in a second mode;
  in response to being in the second mode:
    generating, using the one or more speakers, the determined first vibration pattern to inform a second person about the movement of the first person, wherein the speaker generates the first vibration pattern in a low-frequency range; and
  receiving, from a mobile device, a notification message, that includes a description of a second vibration pattern, wherein the one or more speakers generate the second vibration pattern corresponding to the notification message.

2. The system of claim 1, wherein the second vibration pattern alerts the first person of a fire emergency, a carbon monoxide emergency, a weather-related warning, an incoming phone call, or an incoming text message.

3. The system of claim 1, wherein the one or more speakers are located in a building or in a vehicle, wherein the one or more speakers are attached in the vehicle or are attached to a floor in the building.

4. The system of claim 1, wherein the one or more speakers communicate with an alarm system via a wireless fidelity (W-Fi) router.

5. The system of claim 1, further comprising:
receiving, from the mobile device, a message that causes the one or more speakers to stop playing the first vibration pattern.

6. The system of claim 1, wherein the first vibration pattern is repeated for a pre-determined period of time.

7. The system of claim 1, wherein the low-frequency range includes 0.1 Hz to 20 Hz.

8. A method for providing a notification, comprising:
determining that a timer has reached a first pre-determined amount of time, and in response transitioning a system to being in a first mode, wherein the system, in response to being in the first mode:
  detects by one or more speakers, vibrations based on movement of a first person; and
  transmits, by the one or more speakers, an electrical output based on the detected vibrations;
in response to the electrical output provided by the one or more speakers, determining a corresponding first vibration pattern;
determining that the timer has reached a second re-determined amount of time, and in response transitioning the system to being in a second mode, wherein the system, in response to being in the second mode;
  generates, using the one or more speakers, the determined first vibration pattern to inform a second person about the movement of the first person;
  receiving, from a device external to the system, a message that includes a description of a second vibration pattern and an instruction for the one or more speakers to generate the second vibration pattern; and
  in response to receiving the message, generating, by the one or more speakers, the second vibration pattern.

9. The method of claim 8, wherein the second vibration pattern indicates a fire emergency, a carbon monoxide emergency, a weather-related warning, an incoming phone call, or an incoming text message.

10. The method of claim 8, wherein the one or more speakers are located in a building or in a vehicle, and wherein the one or more speakers are attached in the vehicle or are attached to a floor in the building.

11. The method of claim 8, further comprising:
receiving, from the device, a second message; and
generating, by the one or more speakers, another vibration pattern corresponding to the second message.

12. The method of claim 8, further comprising:
receiving, from the device, a second message that includes an instruction for the system to stop playing the first vibration pattern; and
in response, stopping the first vibration pattern from continuing to be played by the one or more speakers.

13. The method of claim 8, wherein the first vibration pattern is repeated for a pre-determined period of time.

14. The method of claim 8, wherein the first vibration pattern is generated by the one or more speakers in a low-frequency range from 0.1 Hz to 20 Hz.

15. A non-transitory machine-readable medium having machine executable instructions stored thereon that, when executed by one or more processors, direct the one or more processors to perform a method comprising:
determining that a timer has reached a first pre-determined amount of time, and in response transitioning a system to being in a first mode, wherein the system, in response to being in the first mode:
  detects, by one or more speakers vibrations based on movement of a first person; and
  transmits, by the one or more speakers, an electrical output based on the detected vibrations;
in response to the electrical output provided by the one or more speakers, determining a corresponding first vibration pattern;
determining that the timer has reached a second pre-determined amount of time, and in response transitioning the system to being in a second mode wherein the system, in response to being in the second mode:
  generates, via the one or more speakers, the determined first vibration pattern;
  receiving, from a device external to the system, a message that specifies a second vibration pattern; and
  in response to receiving the message, generating, by the one or more speakers, the second vibration pattern.

16. The non-transitory machine-readable medium of 15, wherein the method further comprises:
receiving, from the device, an instruction to stop playing the first vibration pattern; and
in response, stopping, the one or more speakers from continuing to generate the first vibration pattern.

17. The non-transitory machine-readable medium of 15, wherein the first vibration pattern is generated by the one or more speakers in a low-frequency range from 0.1 Hz to 20 Hz.

* * * * *